United States Patent
Zhou et al.

(10) Patent No.: US 11,088,398 B2
(45) Date of Patent: Aug. 10, 2021

(54) SECONDARY BATTERY AND BATTERY MODULE

(71) Applicant: Contemporary Amperex Technology Co., Limited, Ningde (CN)

(72) Inventors: Yong Zhou, Ningde (CN); Zhijun Guo, Ningde (CN); Jie Zhang, Ningde (CN); Peng Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 16/965,415

(22) PCT Filed: Dec. 26, 2019

(86) PCT No.: PCT/CN2019/128682
§ 371 (c)(1),
(2) Date: Jul. 28, 2020

(87) PCT Pub. No.: WO2020/143466
PCT Pub. Date: Jul. 16, 2020

(65) Prior Publication Data
US 2021/0036379 A1 Feb. 4, 2021

(30) Foreign Application Priority Data

Jan. 7, 2019 (CN) .......................... 201920022518.3

(51) Int. Cl.
*H01M 10/0587* (2010.01)
*H01M 2/26* (2006.01)
(Continued)

(52) U.S. Cl.
CPC ..... *H01M 10/0587* (2013.01); *H01M 50/183* (2021.01); *H01M 50/54* (2021.01);
(Continued)

(58) Field of Classification Search
CPC .. H01M 10/04; H01M 10/0587; H01M 50/15; H01M 50/16; H01M 50/183;
(Continued)

(56) References Cited

U.S. PATENT DOCUMENTS

| | | | |
|---|---|---|---|
| 2002/0142195 A1* | 10/2002 | Ehara | ................ H01M 10/4257 429/7 |
| 2008/0160393 A1* | 7/2008 | Kim | .................... H01M 50/636 429/94 |

(Continued)

FOREIGN PATENT DOCUMENTS

| | | |
|---|---|---|
| CN | 100428535 C | 10/2008 |
| CN | 207800664 U | 8/2018 |

(Continued)

OTHER PUBLICATIONS

The Extended European search report dated Mar. 12, 2021 for European Application No. 19908072.2, 5 pages.

(Continued)

*Primary Examiner* — Lingwen R Zeng
(74) *Attorney, Agent, or Firm* — Law Offices of Liaoteng Wang (57) ABSTRACT

The present disclosure relates to a secondary battery and a battery module. The secondary battery includes: a casing including a receiving cavity and an opening which is in communication with the receiving cavity; an electrode assembly housed in the casing; a first top cover plate, which covers the opening and is connected with the casing, the first top cover plate including an insertion portion extending into the casing and an exposed portion disposed outside the casing; and a sealing member; the casing is provided with a first through hole, the insertion portion is provided with a second through hole, the second through hole includes an inlet which is in communication with the first through hole and an outlet which is in communication with the receiving (Continued)

cavity, and the sealing member is connected to the casing and seals the first through hole.

20 Claims, 8 Drawing Sheets

(51) Int. Cl.
    *H01M 2/08*     (2006.01)
    *H01M 50/54*     (2021.01)
    *H01M 50/183*     (2021.01)
    *H01M 50/16*     (2021.01)
    *H01M 50/15*     (2021.01)
    *H01M 50/209*     (2021.01)
    *H01M 50/609*     (2021.01)
    *H01M 50/618*     (2021.01)
    *H01M 10/04*     (2006.01)
    *H01M 50/627*     (2021.01)
    *H01M 50/342*     (2021.01)
    *H01M 50/645*     (2021.01)

(52) U.S. Cl.
    CPC ............ *H01M 10/04* (2013.01); *H01M 50/15* (2021.01); *H01M 50/16* (2021.01); *H01M 50/209* (2021.01); *H01M 50/3425* (2021.01); *H01M 50/609* (2021.01); *H01M 50/618* (2021.01); *H01M 50/627* (2021.01); *H01M 50/645* (2021.01); *Y02E 60/10* (2013.01)

(58) Field of Classification Search
    CPC ........... H01M 50/209; H01M 50/3425; H01M 50/54; H01M 50/609; H01M 50/618; H01M 50/627; H01M 50/645
    See application file for complete search history.

(56) References Cited

U.S. PATENT DOCUMENTS

2010/0196745 A1*   8/2010   Ahn ...................... H01M 50/10
                                                                429/7
2019/0237743 A1*   8/2019   Zhou ................ H01M 10/0431

FOREIGN PATENT DOCUMENTS

| | | |
|---|---|---|
| CN | 209515844 U | 10/2019 |
| EP | 0771040 A2 | 5/1997 |
| EP | 2922113 A1 | 9/2015 |
| EP | 3343665 A1 | 7/2018 |
| EP | 3522250 A1 | 8/2019 |
| KR | 20160074224 A | 6/2016 |

OTHER PUBLICATIONS

International Search Report for PCT/CN2019/128682, dated Mar. 27, 2020, 11 pages.

* cited by examiner

SECONDARY BATTERY AND BATTERY MODULE

CROSS-REFERENCE TO RELATED APPLICATION

This present application is a National Stage of International Application No. PCT/CN2019/128682 filed on Dec. 26, 2019, which claims the priority of the Chinese patent application No. 201920022518.3, entitled "secondary battery and battery module" and filed on Jan. 7, 2019, both of which are incorporated herein by reference in their entireties.

TECHNICAL FIELD

The present disclosure relates to the technology field of batteries, and in particular, to a secondary battery and a battery module.

BACKGROUND

Generally, the secondary battery includes an electrode assembly, a casing, and a top cover assembly. The electrode assembly includes a positive electrode plate, a negative electrode plate, and a separator disposed between the positive electrode plate and the negative electrode plate. The electrode assembly is housed in the casing, and the top cover assembly is fixedly connected to the casing. The cover assembly includes a top cover plate and electrode terminals provided on the top cover plate, and tabs of the electrode assembly are electrically connected to the electrode terminals of the top cover assembly. The top cover plate is provided with an injection hole which is in communication with a closure space.

However, since the injection hole in the top cover plate and the end portion of the electrode assembly are opposite to each other, when the electrolyte is injected into the casing through the injection hole (in order to improve the injection efficiency, the injection pressure of the electrolyte is often increased), the electrolyte will impact the end surface of the electrode assembly. At this time, the end surface will be deformed due to the excessive impact force applied by the electrolyte.

SUMMARY

The embodiments of the present disclosure provide a secondary battery and a battery module. The secondary battery can reduce the possibility of deformation and displacement of the end surface caused by the impact force applied to the end surface of the electrode assembly during the liquid injection process.

In one aspect, an embodiment of the present disclosure provides a secondary battery, including: a casing, which includes a receiving cavity and an opening which is in communication with the receiving cavity; an electrode assembly housed in the casing; a first top cover plate, which covers the opening and is connected with the casing, the first top cover plate including an insertion portion extending into the casing and an exposed portion disposed outside the casing; and a sealing member; the casing is provided with a first through hole, the insertion portion is provided with a second through hole, the second through hole includes an inlet which is in communication with the first through hole and an outlet which is in communication with the receiving cavity, and the sealing member is connected to the casing and seals the first through hole.

According to an aspect of the embodiment of the present disclosure, a concave portion is provided on a surface of the insertion portion facing the electrode assembly, the concave portion is in communication with the receiving cavity, and the second through hole is in communication with the concave portion through the outlet.

According to an aspect of the embodiment of the present disclosure, the second through hole includes a first hole segment and a second hole segment, an axis of the first hole segment intersects with an axis of the second hole segment, the inlet is provided at the first hole segment, the outlet is provided at the second hole segment, the first hole segment is in communication with the first through hole, and the second hole segment is in communication with the receiving cavity.

According to an aspect of the embodiment of the present disclosure, the insertion portion abuts against the electrode assembly.

According to an aspect of the embodiment of the present disclosure, the insertion portion includes two bosses spaced apart from each other, one of the two bosses is disposed corresponding to the first through hole, the insertion portion abuts against the electrode assembly though the two bosses, a gap between the two bosses forms the concave portion, and the second through hole is provided on the boss.

According to an aspect of the embodiment of the present disclosure, the casing, the first top cover plate, and the sealing member are all made of plastic.

According to an aspect of the embodiment of the present disclosure, the number of the opening included in the casing is two, and two openings are oppositely disposed along an axial direction of the casing, and the secondary battery further includes a second top cover plate, the first top cover plate and the second top cover plate respectively closes the two openings, an overflow hole is provided on the second top cover plate, the secondary battery further includes an explosion-proof membrane for closing the overflow hole, and the first through hole, the second through hole, and the overflow hole are all located on the same side of an axis of the casing.

According to an aspect of the embodiment of the present disclosure, the electrode assembly is formed by winding a positive electrode plate, a negative electrode plate, and a separator disposed between the positive electrode plate and the negative electrode plate around a winding axis, and an end surface of the electrode assembly is disposed corresponding to the opening.

According to an aspect of the embodiment of the present disclosure, the secondary battery further includes an electrode terminal provided on the first top cover plate, the electrode assembly includes a tab that extends into the concave portion and is connected with the electrode terminal, the first top cover plate further includes a protective member connected with the insertion portion, and the protective member is disposed between the tab and an aperture of the second through hole to protect the tab.

The secondary battery according to the embodiment of the present disclosure includes the casing, the electrode assembly disposed in the casing, and the first top cover plate connected with the casing. The first through hole is provided on the casing according to this embodiment. The second through hole which is in communication with the first through hole is provided on the first top cover plate. During the liquid injection operation, the electrolyte is injected into the casing through the first through hole and the second through hole. Since the electrolyte needs to pass through the first through hole and the second through hole to enter the casing, the flow velocity of the electrolyte is slowed down. Therefore, the impact force applied by the electrolyte that enters the casing to the end surface of the electrode assembly will be relatively reduced, and thereby reducing the possibility of deformation of the end surface of the electrode assembly or the possibility of structural damage to the end surface of the electrode assembly. Therefore, it is beneficial to reduce the damage rate of the secondary battery due to liquid injection and to improve the yielding rate.

In another aspect, an embodiment of the present disclosure provides a battery module including two or more secondary batteries as described in the above embodiment, and the two or more secondary batteries are arranged side by side in the same direction.

BRIEF DESCRIPTION OF THE DRAWINGS

The features, advantages, and technical effects of the exemplary embodiments of the present disclosure will be described below with reference to the drawings.

In the drawings, the figures are not drawn to actual scale, in which:

10—secondary battery;
20—casing; 20a—axis; 201—opening; 202—receiving cavity; 203—first through hole;
30—electrode assembly; 301—main body portion; 302—pole tab;
40—first top cover plate; 401—insertion portion; 402—exposed portion; 403—concave portion;
404—second through hole; 404a—inlet; 404b—outlet; 404c—first hole segment; 404d—second hole segment;
405—boss; 406—protective member;
50—sealing member;
60—second top cover plate; 601—overflow hole;
70—explosion-proof membrane;
80—electrode terminal;
90—liquid injection device;
100—battery module; 101—busbar;
X—length direction; Y—width direction; Z—thickness direction.

DETAILED DESCRIPTION

The implementations of the present disclosure are described in further detail below with reference to the accompanying drawings and embodiments. The detailed description of the following embodiments and drawings are used to exemplarily illustrate the principle of the present disclosure, rather than to limit the scope of the disclosure. That is to say, the present disclosure is not limited to the described embodiments.

In the description of the present disclosure, it should be stated, unless otherwise specified, "a plurality of" refers to two or more; and the directions or positional relationships indicated by the terms such as "upper", "lower", "left", "right", "inner", "outside" and the like, are only for the convenience of describing the present disclosure and simplifying the description, and do not mean or imply that the involved device or element must have a specific orientation or must be configured or operated in the specific orientation, therefore, they cannot be understood as limiting the present disclosure. In addition, the terms "first", "second", and the like are only used for descriptive purposes, and should not be interpreted as indicating or implying relative importance.

In the description of the present disclosure, it should also be stated, unless otherwise specified and limited, the terms "installed", "connected with", and "connected to" should be understood in a broad sense. For example, a connection may refer to fixed connection or disassembly connection; or may refer to integral connection; or may refer to direct connection or indirect connection through an intermediate medium. For the ordinary person skilled in the art, the specific meanings of the above terms in the present disclosure may be understood according to specific situations.

In order to better understand the present disclosure, the secondary battery 10 and the battery module 100 according to the embodiments of the present disclosure are described in detail below with reference to FIGS. 1 to 8.

Figure 1:
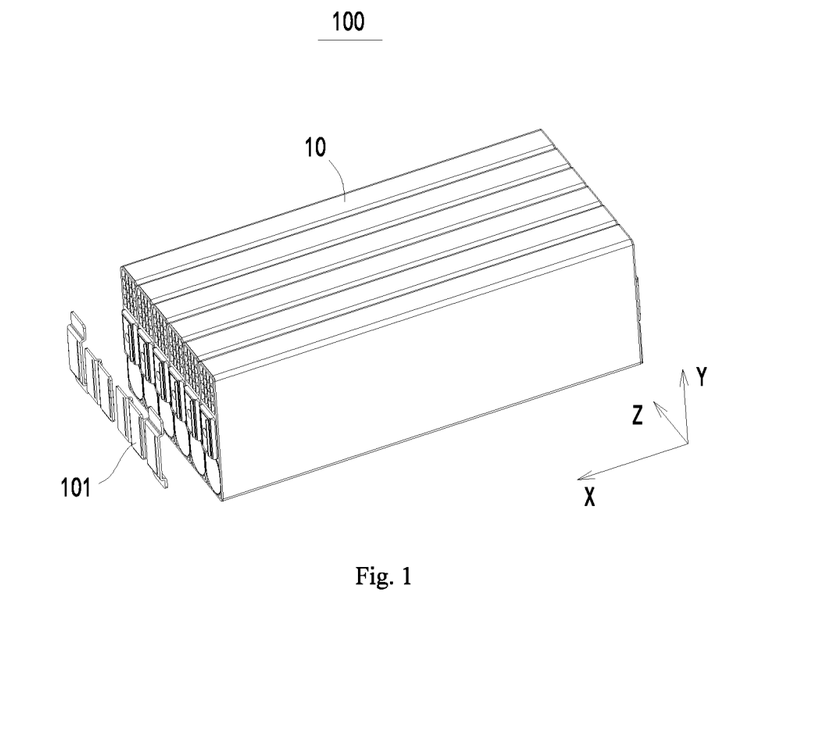
FIG. 1 is a schematic exploded view of a battery module according to an embodiment of the present disclosure.

As shown in FIG. 1, according to an embodiment of the present disclosure, there is provided a battery module 100 including: a plurality of secondary batteries 10 according to this embodiment and a busbar 101 for connecting two secondary batteries 10. The plurality of secondary batteries 10 are arranged side by side in the same direction. One end of the busbar 101 is fixedly connected to one of the two secondary batteries 10, and the other end thereof is fixedly connected to the other of the two secondary batteries 10.

The battery module 100 according to the embodiment of the present disclosure includes the secondary batteries 10 in the above embodiment. Since the secondary battery 10 in the above embodiment has good safety performance, the safety and reliability of the battery module 100 according to the present embodiment during use are improved.

Figure 2:
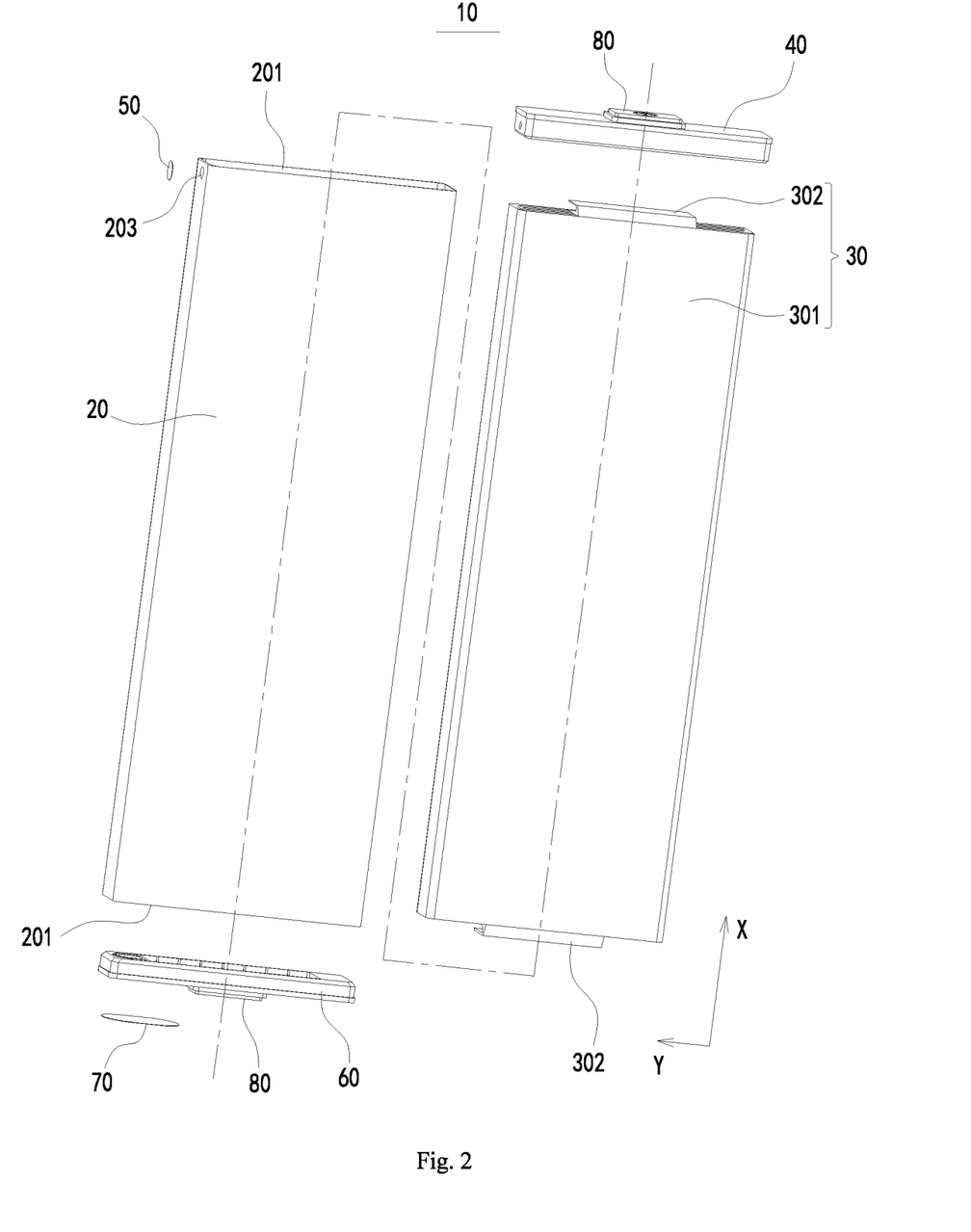
FIG. 2 is a schematic exploded view of a secondary battery according to an embodiment of the present disclosure.

As shown in FIG. 2, the secondary battery 10 according to the embodiment of the present disclosure includes a casing 20, an electrode assembly 30 housed in the casing 20, and a first top cover plate 40 connected to the casing 20. In one embodiment, the first top cover plate 40 is sealingly connected to the casing 20.

Figure 3:
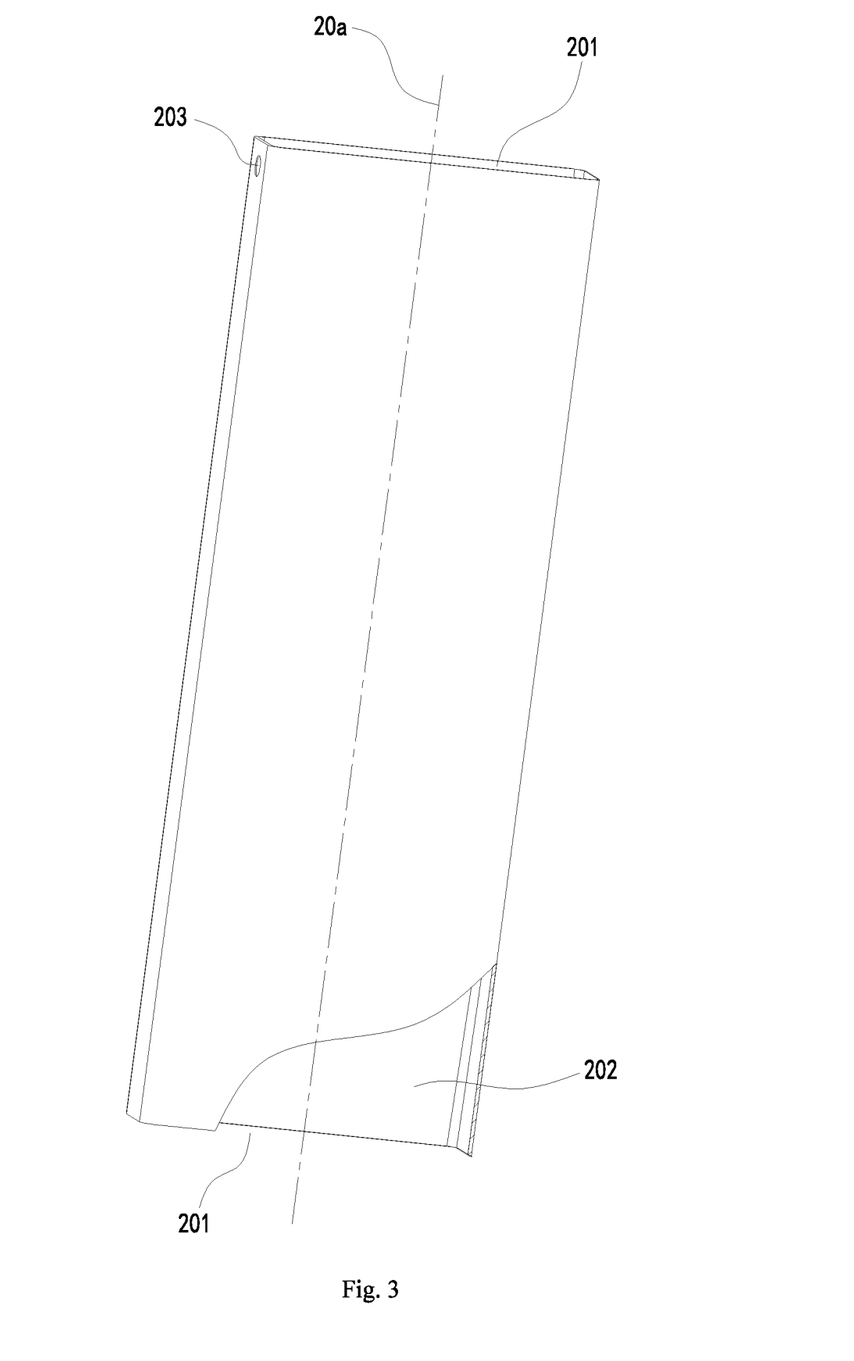
FIG. 3 is a schematic structural view of a casing according to an embodiment of the present disclosure.

As shown in FIG. 3, the casing 20 according to this embodiment may have a rectangular prism shape or any other shape. The casing 20 includes a receiving cavity 202 which receives the electrode assembly 30 and the electrolyte, and an opening 201 which is in communication with the receiving cavity 202. The first top cover plate 40 covers the opening 201 and is connected to the casing 20. The casing 20 may be made of a material such as aluminum, aluminum alloy, plastic, or the like. In the embodiment of the present disclosure, the casing 20 is optionally made of plastic. The casing 20 according to this embodiment includes an axis, and the receiving cavity 202 extends in a direction along the axis. In one example, the axis of the casing 20 is a straight line.

Referring to FIG. 2, the electrode assembly 30 according to this embodiment includes a main body portion 301 which is formed by stacking or winding the first electrode plate, the second electrode plate, and the separator together, and a tab 302 connected to the main body portion 301. In one embodiment, the main body portion 301 includes two opposite end surfaces. Two tabs 302 extend from the two end surfaces, respectively. The separator is an insulator interposed between the first electrode plate and the second electrode plate. The electrode assembly 30 according to this embodiment includes one layer of the separator, one layer of the first electrode plate, one layer of the separator, and one layer of the second electrode plate. In this embodiment, the first electrode plate is exemplified as a positive electrode plate, and the second electrode plate is exemplified as a negative electrode plate. Similarly, in other embodiments, the first electrode plate may also be a negative electrode plate, and the second electrode plate is a positive electrode plate. In addition, the positive electrode active material is coated on the coating region of the positive electrode plate, and the negative electrode active material is coated on the coating region of the negative electrode plate. The uncoated region extending from the main body portion 301 serves as the tab 302. The electrode assembly 30 includes two tabs 302, namely, a positive tab and a negative tab, the positive tab extends from the coating region of the positive electrode plate; and the negative tab extends from the coating region of the negative electrode plate. In one embodiment, an end surface of the electrode assembly 30 is disposed corresponding to the opening 201 of the casing 20. The first top cover plate 40 is disposed corresponding to the end surface of the electrode assembly 30.

Figure 5:
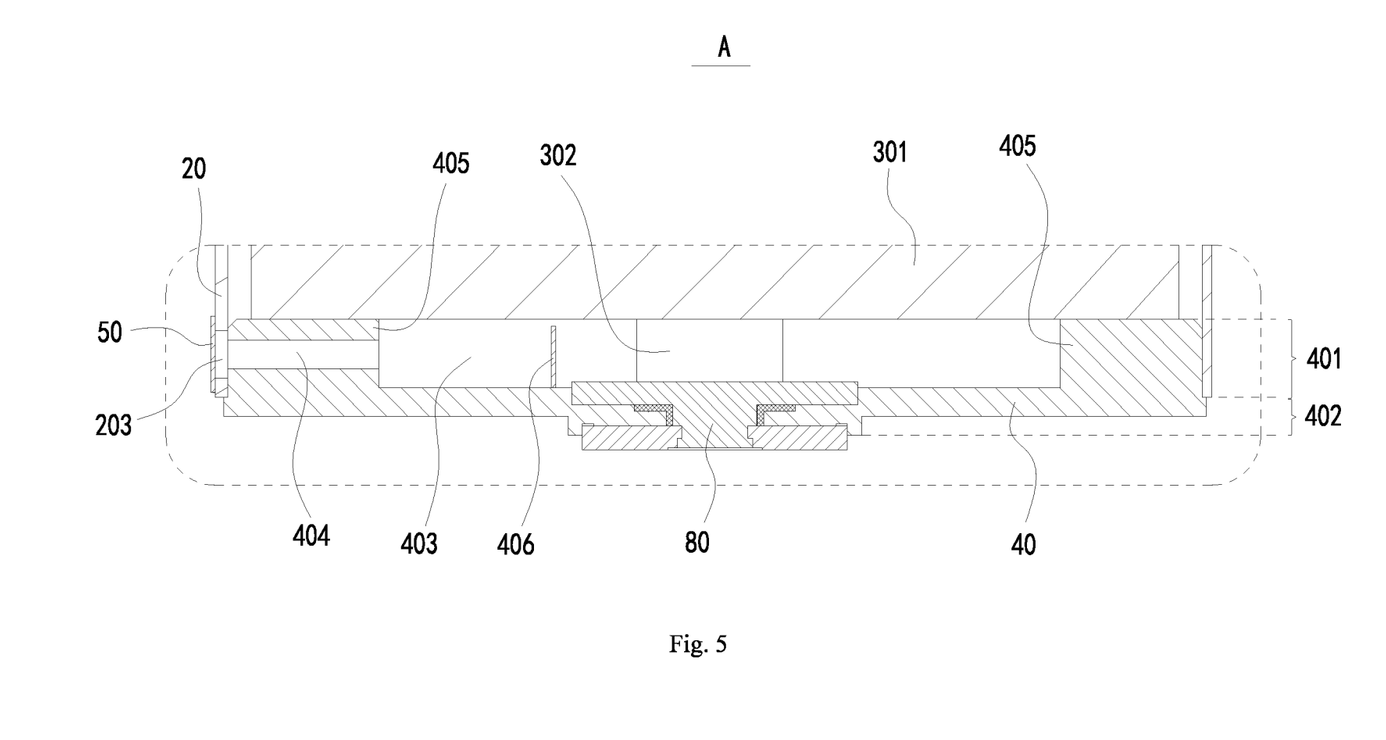
FIG. 5 is an enlarged view at A in FIG. 4.

As shown in FIG. 5, the first top cover plate 40 according to this embodiment includes an insertion portion 401 extending into the casing 20 and an exposed portion 402 disposed outside the casing 20. The first top cover plate 40 is connected with the casing 20 through the insertion portion 401. The casing 20 is provided with a first through hole 203. The insertion portion 401 is provided with a second through hole 404. The second through hole 404 includes an inlet 404a and an outlet 404b. The second through hole 404 is in communication with the first through hole 203 through the inlet 404a. The second through hole 404 is in communication with the receiving cavity 202 through the outlet 404b. The first through hole 203 and the second through hole 404 together constitute a liquid injection channel. Before a liquid injection process is performed to the secondary battery 10, the receiving cavity 202 is in communication with the outside atmosphere through the first through hole 203 and the second through hole 404. The electrolyte can be injected into the receiving cavity 202 of the casing 20 through the first through hole 203 and the second through hole 404. Since the electrolyte needs to pass through the first through hole 203 and the second through hole 404 to enter the receiving cavity 202, a flow path of the electrolyte will become longer and a flow velocity thereof will be relatively slowed down, which is beneficial to reduce the impact force applied by the electrolyte to the electrode assembly 30.

The secondary battery 10 according to this embodiment further includes a sealing member 50. The sealing member 50 is connected to the casing 20 and seals the first through hole 203, thereby ensuring a sealed state being formed inside the casing 20 and preventing leakage of the electrolyte. In one embodiment, the sealing member 50 may be a sealing piece. When the sealing member 50 is made of the same material as the casing 20, the sealing member 50 may be connected to the casing 20 by welding. Optionally, the sealing member 50 and the casing 20 are made of plastic, and both are sealingly connected by hot-melt welding. Alternatively, the sealing member 50 may be a sealing plug. The sealing member 50 may be connected with the casing 20 or the insertion portion 401 with threads to realize a sealed connection. Alternatively, a sealed connection may be achieved by injecting a sealant between the sealing member 50 and the casing 20 and/or between the sealing member 50 and the insertion portion 401.

Figure 4:
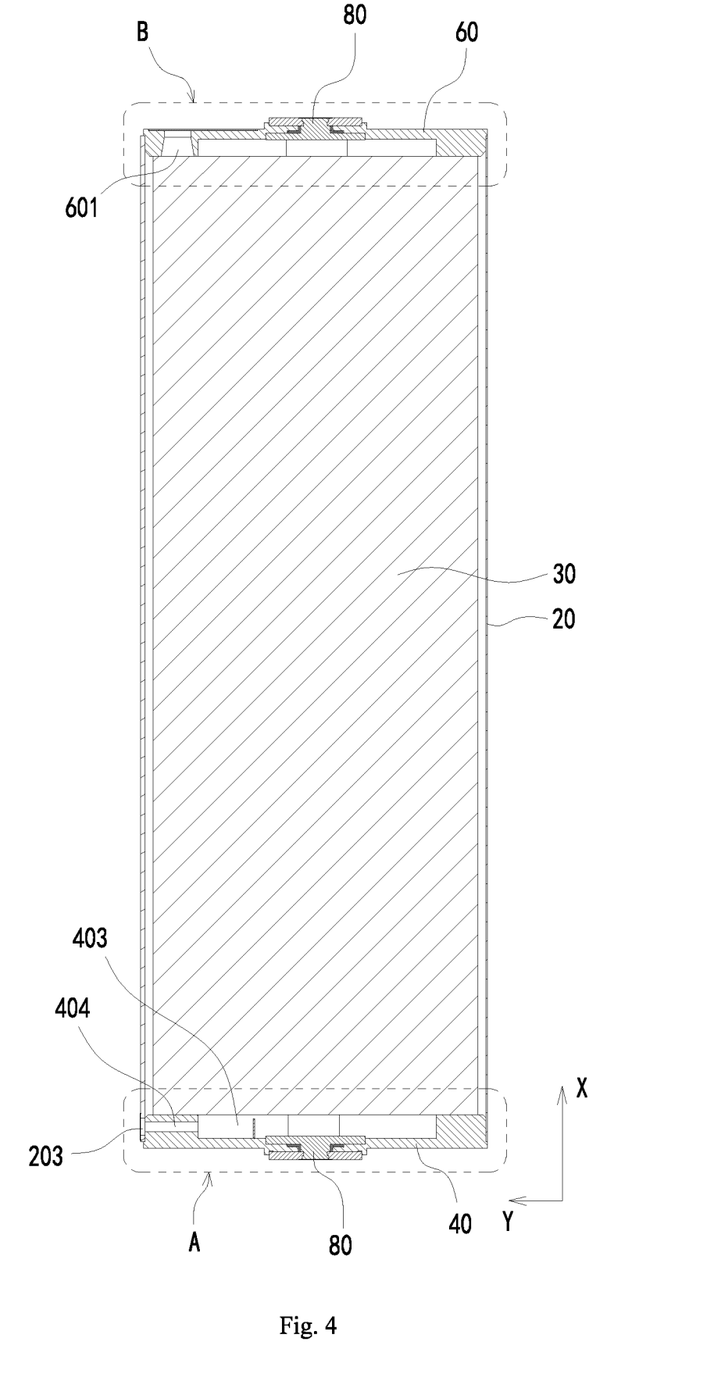
FIG. 4 is a schematic sectional view of a secondary battery according to an embodiment of the present disclosure.

In one embodiment, referring to FIG. 4, a concave portion 403 is provided on a surface of the insertion portion 401 facing the electrode assembly 30. The concave portion 403 is in communication with the receiving cavity 202. The second through hole 404 is in communication with the concave portion 403 through the outlet 404b. In this embodiment, the concave portion 403 is disposed corresponding to the end surface of the electrode assembly 30, and a portion of the first top cover plate 40 corresponding to the concave portion 403 does not contact the end surface of the electrode assembly 30, so that a buffer space is formed in the concave portion 403. The outlet 404b of the second through hole 404 is disposed on a side wall of the concave portion 403. In the process of injecting the electrolyte into the secondary battery 10, the electrolyte flows through the first through hole 203 and the second through hole 404 in order, then flows into the concave portion 403 through the outlet 404b of the second through hole 404, and finally flows into the receiving cavity 202 of the casing 20 through the concave portion 403. After the electrolyte enters the concave portion 403, it will be buffered by the concave portion 403, so that the flow velocity of the electrolyte flowing out of the concave portion 403 will be slowed down and the impact force applied by the electrolyte to the end surface of the electrode assembly 30 will be correspondingly reduced. Therefore, the separator of the electrode assembly 30 will not be deformed and displaced by the strong impact of the electrolyte, and thus the possibility of occurrence of short circuit due to the contact between the positive electrode plate and the negative electrode plate of the electrode assembly 30 with each other caused by the deformation and displacement of the separator is reduced. In one example, the first through hole 203 and the second through hole 404 are both straight holes. Optionally, the first through hole 203 is disposed coaxially with the second through hole 404.

In one embodiment, referring to FIG. 5, the insertion portion 401 of the first top cover plate 40 abuts against the electrode assembly 30. After the first top cover plate 40 is connected to the casing 20, a restraining force is applied to the electrode assembly 30 in the casing 20 by the insertion portion 401, thereby reducing the possibility of the movement of the electrode assembly 30 in the casing 20. A surface, of the insertion portion 401 of the first top cover plate 40, that abuts against the electrode assembly 30 is a flat surface. This reduces the possibility of stress concentration in the region of the electrode assembly 30 that abuts against the insertion portion 401.

In one embodiment, referring to FIG. 5, the insertion portion 401 of the first top cover plate 40 includes two bosses 405 that are spaced apart from each other. The insertion portion 401 abuts against the electrode assembly 30 through the bosses 405. A gap between the two bosses 405 forms the concave portion 403. The first through hole 203 is disposed corresponding to one boss 405, on which the second through hole 404 is provided.

In one embodiment, referring to FIG. 5, the secondary battery 10 includes an electrode terminal 80 disposed on the first top cover plate 40. The first top cover plate 40 includes an electrode lead-out hole. The electrode lead-out hole is disposed corresponding to and is in communicate with the concave portion 403 each other. The electrode terminal 80 covers the electrode lead-out hole and is sealingly connected with the first top cover plate 40. The tab 302 of the electrode assembly 30 extends into the concave portion 403 and is connected with the electrode terminal 80, so that the electrode assembly 30 can be charged and discharged through the electrode terminal 80. The first top cover plate 40 further includes a protective member 406 connected with the insertion portion 401. The protective member 406 is disposed between the tab 302 and an aperture of the second through hole 404 to protect the tab 302. Since the tab 302 is protected by the protective member 406, the electrolyte flowing out of the second through hole 404 will be blocked by the protective member 406, so that the electrolyte will not directly impact the tab 302. Therefore, the possibility that the tab 302 itself is broken or the tab 302 is disconnected from the electrode terminal 80 when the tab 302 is impacted by the electrolyte is reduced. In one embodiment, the protective member 406 has a plate-like structure.

In one embodiment, the number of the openings 201 included in the casing 20 is two.

Figure 6:
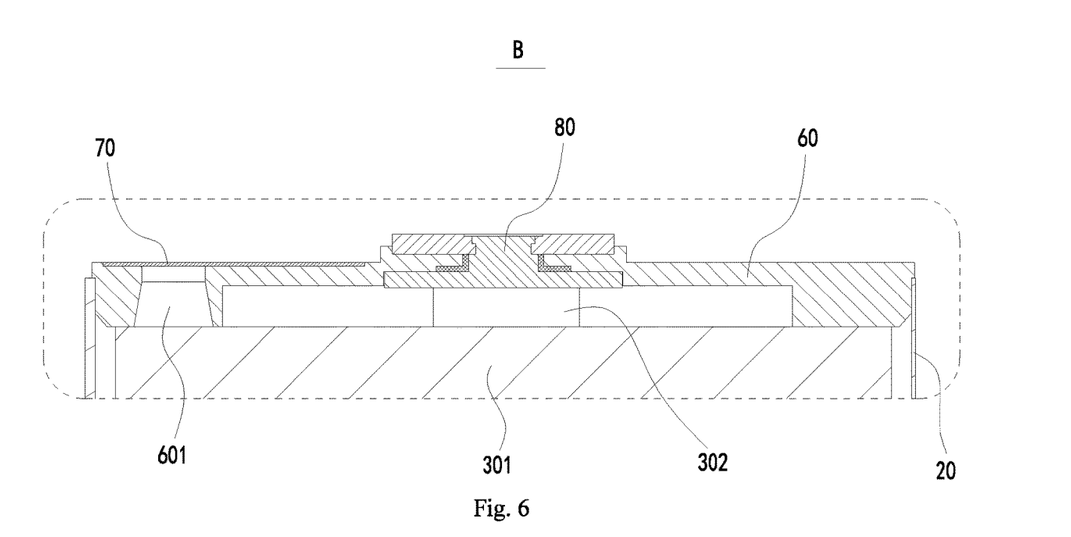
FIG. 6 is an enlarged view of B in FIG. 4.

The casing 20 has a cylindrical structure as a whole. Two openings 201 are oppositely disposed along the axial direction of the casing 20. The secondary battery 10 further includes a second top cover plate 60. The first top cover plate 40 and the second top cover plate 60 respectively cover the two openings 201 of the casing 20. The second top cover plate 60 is connected with the casing 20. As shown in FIG. 6, an overflow hole 601 is provided on the second top cover plate 60.

The secondary battery 10 further includes an explosion-proof membrane 70 for closing the overflow hole 601. During the liquid injection process, the gas in the casing 20 can be discharged to the atmospheric environment through the overflow hole 601 disposed on the second top cover plate 60, thereby maintaining the pressure balance between the casing 20 and the atmospheric environment, which is beneficial to improve the injection effectiveness. After the liquid injection process is completed, the explosion-proof membrane 70 covers the overflow hole 601, and the explosion-proof membrane 70 is connected with the second top cover plate 60. During the use of the secondary battery 10, when the explosion-proof membrane 70 is exploded due to excessive gas generated inside the casing 20, the gas in the casing 20 can be quickly released to the atmospheric environment through the overflow hole 601, reducing the possibility of explosion of the secondary battery 10. In one example, the first through hole 203, the second through hole 404, and the overflow hole 601 are all located on the same side of the axis of the casing 20, so that during the liquid injection process of the secondary battery 10, the first through hole 203, the first through hole 203, the second through hole 404, and the overflow hole 601 are all at a high position, which is beneficial to increase the amount of electrolyte to be injected into the casing 20.

Figure 7:
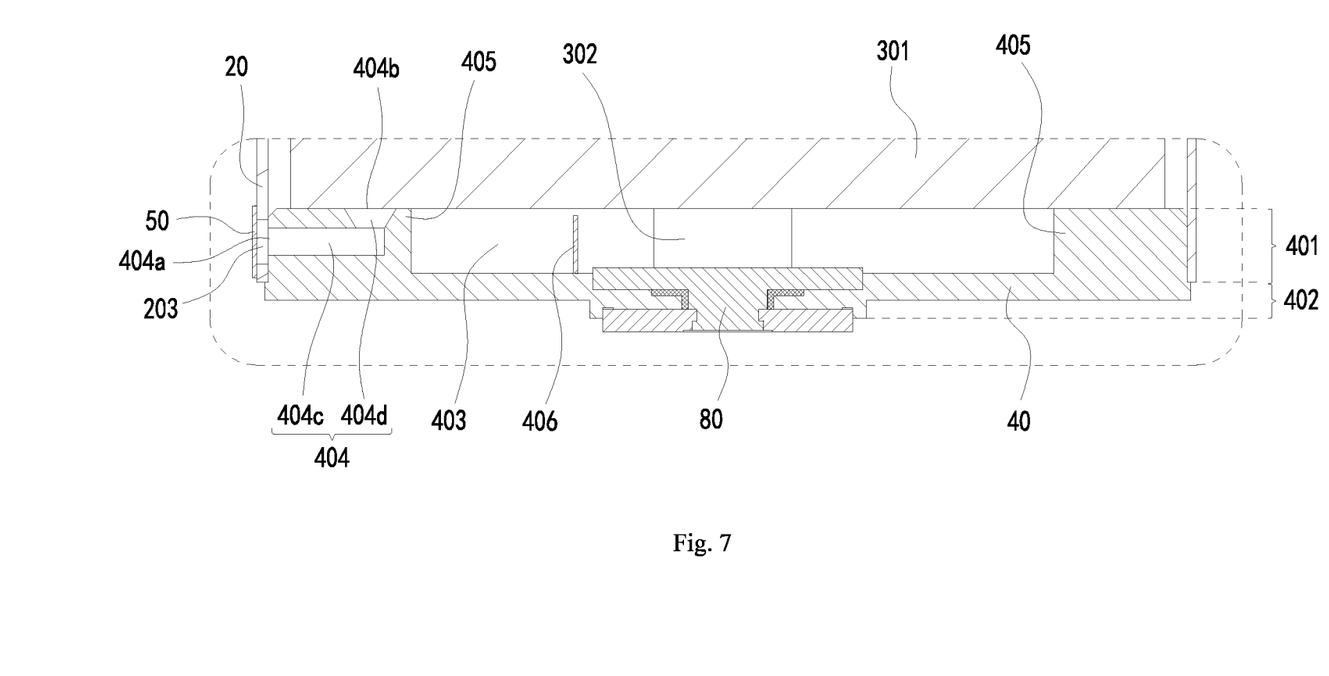
FIG. 7 is a partial schematic view of a secondary battery according to another embodiment of the present disclosure.

In another embodiment, referring to FIG. 7, the second through hole 404 includes a first hole segment 404c and a second hole segment 404d. An axis of the first hole segment 404c intersects with an axis of the second hole segment 404d. The inlet 404a is provided at the first hole segment 404c, and the outlet 404b is provided at the second hole segment 404d. The first hole segment 404c is in communication with the first through hole 203 through the inlet 404a. The second hole segment 404d is in communication with the receiving cavity 202 through the outlet 404b. Since the first hole segment 404c and the second hole segment 404d are disposed to be intersected, the flow direction of the electrolyte that enters the second hole segment 404d from the first hole segment 404c changes, so that the flow velocity of the electrolyte can be slowed down, and accordingly the impact force applied by the electrolyte discharged from the second hole segment 404d to the end surface of the electrode assembly 30 can be reduced. In one example, the first hole segment 404c extends in a width direction Y, and the second hole segment 404d extends in a length direction X. Alternatively, the second hole segment 404d is a tapered hole, and a larger aperture of the second hole segment 404d is close to the electrode assembly 30. Since a diameter of the second hole segment 404d is larger than a diameter of the first hole segment 404c, the second hole segment 404d will buffer the electrolyte that enters the second hole segment 404d from the first hole segment 404c, so that the flow velocity of the electrolyte is further slowed down. In one example, the first hole segment 404c is a straight hole. The first hole segment 404c is disposed coaxially with the first through hole 203.

Figure 8:
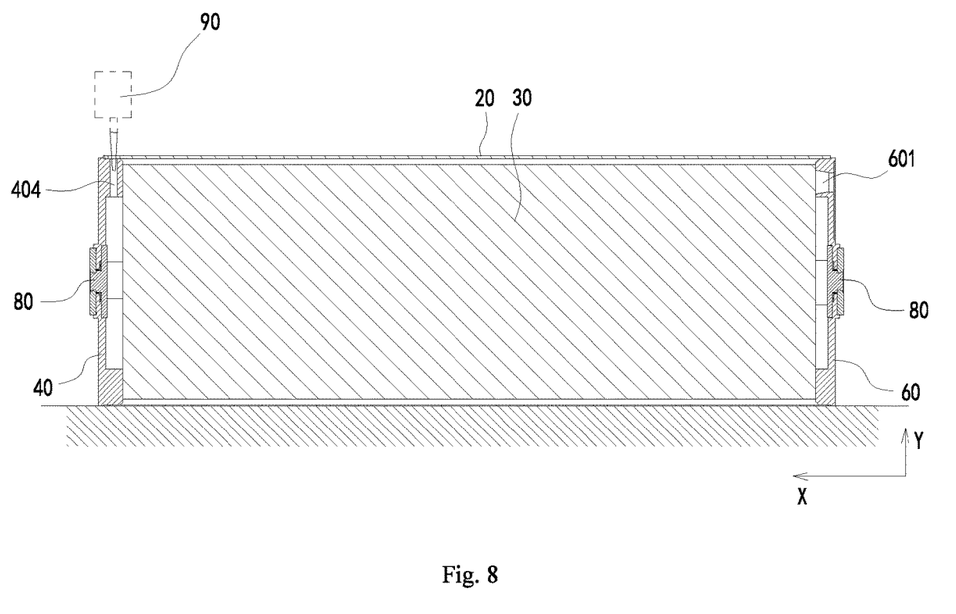
FIG. 8 is a schematic view of a secondary battery in a liquid injection state according to an embodiment of the present disclosure.

In one embodiment, the electrode assembly 30 has a flat structure. The electrode assembly 30 has predetermined length, width, and thickness, and the thickness is smaller than the length and also smaller than the width. Two or more electrode assemblies 30 are disposed in the casing 20. The two or more electrode assemblies 30 are arranged side by side in the thickness direction Z. The electrode assembly 30 includes two opposite end surfaces in the length direction X. Correspondingly, the casing 20 for receiving the electrode assemblies 30 has predetermined length, width, and thickness. The receiving cavity 202 of the casing 20 extends in the length direction X, so that the electrode assembly 30 is installed into the casing 20 along the length direction X. The first through hole 203 disposed in the casing 20 extends in the width direction Y, and the second through hole 404 disposed in the insertion portion 401 also extends in the width direction Y. Referring to FIG. 8, when the liquid injection operation is performed to the secondary battery 10 according to this embodiment, the secondary battery 10 first stands on a horizontal surface. At this time, the length direction X of the casing 20 is the horizontal direction, and the width direction Y is the vertical direction. In this regard, on one hand, the height of the liquid injection device 90 to be lifted in the vertical direction only needs to be slightly greater than or equal to the width of the casing 20, as compared with the case where the length direction X of the casing 20 is the vertical direction, the liquid injection device 90 according to this embodiment has a small lifting height and thus has a relatively short feeding stroke, and therefore it can occupy less space in the vertical direction. On the other hand, as compared with the case where the casing 20 is placed on the horizontal plane when the length direction X thereof is the vertical direction, in the case where the casing 20 is placed on the horizontal plane when the width direction Y thereof is the vertical direction, the secondary battery 10 has low gravity center and good overall stability, thereby reducing the possibility of the deformation of the casing 20 due to the compressive stress applied by the liquid injection device 90 to the case 20 during the liquid injection process of the secondary battery 10.

The secondary battery 10 according to the embodiment of the present disclosure includes the casing 20, the electrode assembly 30 disposed in the casing 20, and the first top cover plate 40 connected with the casing 20. The first through hole 203 is provided on the casing 20 according to this embodiment. The second through hole 404 which is in communication with the first through hole 203 is provided on the first top cover plate 40. During the liquid injection operation, the electrolyte is injected into the casing 20 through the first through hole 203 and the second through hole 404. Since the electrolyte needs to pass through the first through hole 203 and the second through hole 404 to enter the casing 20, the flow velocity of the electrolyte is slowed down. Therefore, the impact force applied by the electrolyte that enters the casing 20 to the end surface of the electrode assembly 30 will be relatively reduced, and thereby reducing the possibility of deformation of the end surface of the electrode assembly 30 or the possibility of structural damage to the end surface of the electrode assembly 30. Therefore, it is beneficial to reduce the damage rate of the secondary battery 10 due to liquid injection and to improve the yielding rate.

Although the present disclosure has been described with reference to the optional embodiments, various modifications may be made thereto and components thereof may be replaced with equivalents without departing from the scope of the present disclosure. In particular, as long as there is no structural conflict, the technical features mentioned in the embodiments can be combined in any manner. The present application is not limited to the specific embodiments disclosed herein, but includes all technical solutions that fall within the scope of the claims.

What is claimed is:

1. A secondary battery comprising:
   a casing, which comprises a receiving cavity and an opening which is in communication with the receiving cavity;
   an electrode assembly housed in the casing;
   a first top cover plate, which covers the opening and is connected with the casing, the first top cover plate comprising an insertion portion extending into the casing and an exposed portion disposed outside the casing; and
   a sealing member, wherein
   the casing is provided with a first through hole, the insertion portion is provided with a second through hole, the second through hole comprises an inlet which is in communication with the first through hole and an outlet which is in communication with the receiving cavity, and the sealing member is connected to the casing and seals the first through hole.

2. The secondary battery according to claim 1, wherein a concave portion is provided on a surface of the insertion portion facing the electrode assembly, the concave portion is in communication with the receiving cavity, and the second through hole is in communication with the concave portion through the outlet.

3. The secondary battery according to claim 1, wherein the second through hole comprises a first hole segment and a second hole segment, an axis of the first hole segment intersects with an axis of the second hole segment, the inlet is provided at the first hole segment, the outlet is provided at the second hole segment, the first hole segment is in communication with the first through hole, and the second hole segment is in communication with the receiving cavity.

4. The secondary battery according to claim 1, wherein the insertion portion abuts against the electrode assembly.

5. The secondary battery according to claim 4, wherein the insertion portion comprises two bosses spaced apart from each other, one of the two bosses is disposed corresponding to the first through hole, the insertion portion abuts against the electrode assembly though the two bosses, a gap between the two bosses forms the concave portion, and the second through hole is provided on the boss.

6. The secondary battery according to claim 4, wherein the casing, the first top cover plate, and the sealing member are all made of plastic.

7. The secondary battery according to claim 1, wherein the number of the opening comprised in the casing is two and two openings are oppositely disposed along an axial direction of the casing, the secondary battery further comprises a second top cover plate, the first top cover plate and the second top cover plate respectively closes the two openings, an overflow hole is provided on the second top cover plate, the secondary battery further comprises an explosion-proof membrane for closing the overflow hole, and the first through hole, the second through hole, and the overflow hole are all located on the same side of an axis of the casing.

8. The secondary battery according to claim 1, wherein the electrode assembly is formed by winding a positive electrode plate, a negative electrode plate, and a separator disposed between the positive electrode plate and the negative electrode plate around a winding axis, and an end surface of the electrode assembly is disposed corresponding to the opening.

9. The secondary battery according to claim 2, wherein the secondary battery further comprises an electrode terminal provided on the first top cover plate, the electrode assembly comprises a tab that extends into the concave portion and is connected with the electrode terminal, the first top cover plate further comprises a protective member connected with the insertion portion, and the protective member is disposed between the tab and an aperture of the second through hole to protect the tab.

10. A battery module, wherein comprising two or more secondary batteries according to claim 1, the two or more secondary batteries being arranged side by side in the same direction.

11. The secondary battery according to claim 2, wherein the second through hole comprises a first hole segment and a second hole segment, an axis of the first hole segment intersects with an axis of the second hole segment, the inlet is provided at the first hole segment, the outlet is provided at the second hole segment, the first hole segment is in communication with the first through hole, and the second hole segment is in communication with the receiving cavity.

12. The secondary battery according to claim 2, wherein the insertion portion abuts against the electrode assembly.

13. The secondary battery according to claim 3, wherein the insertion portion abuts against the electrode assembly.

14. The secondary battery according to claim 1, wherein the casing, the first top cover plate, and the sealing member are all made of plastic.

15. The secondary battery according to claim 2, wherein the number of the opening comprised in the casing is two and two openings are oppositely disposed along an axial direction of the casing, the secondary battery further comprises a second top cover plate, the first top cover plate and the second top cover plate respectively closes the two openings, an overflow hole is provided on the second top cover plate, the secondary battery further comprises an explosion-proof membrane for closing the overflow hole, and the first through hole, the second through hole, and the overflow hole are all located on the same side of an axis of the casing.

16. The secondary battery according to claim 3, wherein the number of the opening comprised in the casing is two and two openings are oppositely disposed along an axial direction of the casing, the secondary battery further comprises a second top cover plate, the first top cover plate and the second top cover plate respectively closes the two openings, an overflow hole is provided on the second top cover plate, the secondary battery further comprises an explosion-proof membrane for closing the overflow hole, and the first through hole, the second through hole, and the overflow hole are all located on the same side of an axis of the casing.

17. The secondary battery according to claim 4, wherein the number of the opening comprised in the casing is two and two openings are oppositely disposed along an axial direction of the casing, the secondary battery further comprises a second top cover plate, the first top cover plate and the second top cover plate respectively closes the two openings, an overflow hole is provided on the second top cover plate, the secondary battery further comprises an explosion-proof membrane for closing the overflow hole, and the first through hole, the second through hole, and the overflow hole are all located on the same side of an axis of the casing.

18. The secondary battery according to claim 5, wherein the number of the opening comprised in the casing is two and two openings are oppositely disposed along an axial direction of the casing, the secondary battery further comprises a second top cover plate, the first top cover plate and the second top cover plate respectively closes the two openings, an overflow hole is provided on the second top cover plate, the secondary battery further comprises an explosion-proof membrane for closing the overflow hole, and the first through hole, the second through hole, and the overflow hole are all located on the same side of an axis of the casing.

19. The secondary battery according to claim 3, wherein the secondary battery further comprises an electrode terminal provided on the first top cover plate, the electrode assembly comprises a tab that extends into the concave portion and is connected with the electrode terminal, the first top cover plate further comprises a protective member connected with the insertion portion, and the protective member is disposed between the tab and an aperture of the second through hole to protect the tab.

20. The secondary battery according to claim 4, wherein the secondary battery further comprises an electrode terminal provided on the first top cover plate, the electrode assembly comprises a tab that extends into the concave portion and is connected with the electrode terminal, the first top cover plate further comprises a protective member connected with the insertion portion, and the protective member is disposed between the tab and an aperture of the second through hole to protect the tab.

* * * * *